United States Patent
Liu et al.

(10) Patent No.: US 9,116,591 B2
(45) Date of Patent: Aug. 25, 2015

(54) METHOD AND APPARATUS FOR SCROLL INFORMATION INPUT IN ELECTROMAGNETIC INDUCTION WAY

(75) Inventors: Yingjian Liu, Beijing (CN); Honggang Wang, Beijing (CN); Songlin Wu, Beijing (CN)

(73) Assignee: Hanwang Technology Co., Ltd., Beijing (CN)

(*) Notice: Subject to any disclaimer, the term of this patent is extended or adjusted under 35 U.S.C. 154(b) by 1170 days.

(21) Appl. No.: 13/055,762

(22) PCT Filed: Jul. 27, 2009

(86) PCT No.: PCT/CN2009/072930
§ 371 (c)(1),
(2), (4) Date: Jan. 25, 2011

(87) PCT Pub. No.: WO2010/012216
PCT Pub. Date: Feb. 4, 2010

(65) Prior Publication Data
US 2011/0179382 A1      Jul. 21, 2011

(30) Foreign Application Priority Data
Jul. 28, 2008   (CN) .......................... 2008 1 0117254

(51) Int. Cl.
G06F 3/048     (2013.01)
G06F 3/046     (2006.01)
G06F 3/0485    (2013.01)

(52) U.S. Cl.
CPC .............. G06F 3/046 (2013.01); G06F 3/0485 (2013.01); G06F 3/04855 (2013.01)

(58) Field of Classification Search
CPC .................................................. G06F 3/048
USPC ........................................................ 345/173
See application file for complete search history.

(56) References Cited

U.S. PATENT DOCUMENTS

| 2005/0038944 A1* | 2/2005 | Harada et al. ................. 710/110 |
| 2005/0068342 A1* | 3/2005 | Ouchi et al. ................... 345/684 |
| 2008/0192000 A1* | 8/2008 | Choi et al. ..................... 345/104 |

FOREIGN PATENT DOCUMENTS

| CN | 2567694 Y | 8/2003 |
| CN | 2849827 Y | 12/2006 |

(Continued)

OTHER PUBLICATIONS

Korean Office Action for corresponding Korean Patent Application mailed Jun. 18, 2012.

(Continued)

Primary Examiner — Gregory J Tryder
Assistant Examiner — Sepideh Ghafari
(74) Attorney, Agent, or Firm — Merchant & Gould P.C.

(57) ABSTRACT

There are provided a method and an apparatus for scroll information input in an electromagnetic induction way. The method comprises steps of: definition of scroll bars, where a horizontal scroll bar and a vertical scroll bar are defined for an electromagnetic board by means of a controller of the electromagnetic board; implementation of scrolls, where virtual scrolls for the scroll bars of the electromagnetic board are achieved based on positional changes of an electromagnetic pen over the horizontal scroll bar and the vertical scroll bar of the electromagnetic board; and mapping of scrolls, where the virtual scrolls for the scroll bars of the electromagnetic board are mapped into scrolls for scroll bars in a computer by means of the controller.

14 Claims, 4 Drawing Sheets

(56) References Cited

FOREIGN PATENT DOCUMENTS

| | | | |
|---|---|---|---|
| CN | 1949155 | A | 4/2007 |
| CN | 2567694 | Y | 4/2007 |
| CN | 201233593 | Y | 5/2009 |
| JP | 2000-020194 | A | 1/2000 |
| JP | 2005-539302 | A | 12/2005 |
| TW | 442758 | B | 6/2001 |

OTHER PUBLICATIONS

Chinese Office Action for corresponding Chinese Patent Application No. 200810117254.6 mailed Aug. 9, 2010.
Korean Office Action for corresponding Korean Patent Application No. 2011-7004598 mailed Dec. 31, 2012.
Taiwanese Office Action for corresponding Taiwan Patent Application No. 098125441 mailed Oct. 31, 2012.

* cited by examiner

METHOD AND APPARATUS FOR SCROLL INFORMATION INPUT IN ELECTROMAGNETIC INDUCTION WAY

This application is a National Stage Application of PCT/CN2009/072930, filed 27 Jul. 2009, which claims benefit of Serial No. 200810117254.6, filed 28 Jul. 2008 in China and which applications are incorporated herein by reference. To the extent appropriate, a claim of priority is made to each of the above disclosed applications.

FIELD OF INVENTION

The present invention relates to the computer information input field, and particularly, to a method and an apparatus for scroll information input in an electromagnetic induction way.

DESCRIPTION OF PRIOR ART

An electromagnetic board is a peripheral device for a computer, by which it is possible to transfer data, such as coordinates for a movement trace, magnitudes of pressure, and tilt angles, of an electromagnetic pen over the electromagnetic board to the computer, and thus to achieve writing and drawing. A scroll bar is similar to a wheel of a mouse, that is, a peripheral device for transferring scroll information to the computer. Requirements for horizontal and vertical operations by computer applications may be met by scrolling the scroll bar. For conventional electromagnetic boards, the scroll bar is either implemented by additional hardware designs, which result in increased cost and area; or is implemented in an electromagnetic induction way, by which, however, only a vertical scroll bar is achieved without a horizontal bar, and thus which is not suitable for applications where the horizontal bar is needed.

SUMMARY OF THE INVENTION

It is an object of the present invention to provide a method and an apparatus for scroll information input in an electromagnetic induction way, so as to achieve the complete scroll bar input functions by means of the existing electromagnetic board device and thus to achieve additional effects without increasing the cost. Thus, it is possible to overcome the problem in the prior art that only the vertical scroll bar, without the horizontal scroll bar, can be implemented by the electromagnetic board. To overcome the above problem, the present invention discloses the following solutions.

A method for scroll information input in an electromagnetic induction way, comprises steps of:
  definition of scroll bars, where a horizontal scroll bar and a vertical scroll bar are defined in an inductive area of an electromagnetic board by means of a controller for the electromagnetic board;
  implementation of scrolls, where virtual scrolls for the scroll bars are achieved based on positional changes of an electromagnetic pen over the horizontal scroll bar and the vertical scroll bar in the inductive area; and
  mapping of scrolls, where the virtual scrolls for the scroll bars are mapped into scrolls for scroll bars in a computer by means of the controller.

In the step of definition of scroll bars, the controller of the electromagnetic board defines a horizontal region in the inductive area of the electromagnetic board as the horizontal scroll bar, and defines a vertical region thereof as the vertical scroll bar.

In the step of implementation of scrolls, the controller determines horizontal and vertical coordinates of the electromagnetic pen in the inductive area, further determines whether the electromagnetic pen is moving over the horizontal scroll bar or moving over the vertical scroll bar, and achieves the virtual scrolls for the scroll bars based on the positional changes of the electromagnetic pen over the scroll bars.

The step of determining the electromagnetic pen is moving over the horizontal scroll bar comprises:
  plural ones from a set of horizontally arranged coils of the electromagnetic board being sequentially turned on and transmitting signals, one from a set of vertically arranged coils of the electromagnetic board being turned on and sequentially receiving the signals, and the controller determining the horizontal coordinate of the electromagnetic pen based on the variation in intensity of the signals received by the one vertically arranged coil;
  one from the set of the horizontally arranged coils of the electromagnetic board being turned on and sequentially transmitting signals, plural ones from the set of the vertically arranged coils of the electromagnetic board being sequentially turned on and receiving the signals, and the controller determining the vertical coordinate of the electromagnetic pen based on the variation in intensity of the signals received by the plural vertically arranged coils; and
  the controller of the electromagnetic board determining that the electromagnetic pen is moving over the horizontal scroll bar based on the horizontal coordinate and the vertical coordinate, and achieving the virtual scroll for the horizontal scroll bar of the electromagnetic board based on the positional change of the electromagnetic pen over the horizontal scroll bar.

The step of determining the electromagnetic pen is moving over the vertical scroll bar comprises:
  one from a set of horizontally arranged coils of the electromagnetic board being turned on and sequentially transmitting signals, plural ones from a set of vertically arranged coils of the electromagnetic board being sequentially turned on and receiving the signals, and the controller determining the vertical coordinate of the electromagnetic pen based on the variation in intensity of the signals received by the plural vertically arranged coils;
  plural ones from the set of the horizontally arranged coils of the electromagnetic board being sequentially turned on and transmitting signals, one from the set of the vertically arranged coils of the electromagnetic board being turned on and sequentially receiving the signals, and the controller determining the horizontal coordinate of the electromagnetic pen based on intensities of the signals received by the one vertically arranged coil; and
  the controller of the electromagnetic board determining that the electromagnetic pen is moving over the vertical scroll bar based on the horizontal coordinate and the vertical coordinate, and achieving the virtual scroll for the vertical scroll bar of the electromagnetic board based on the positional change of the electromagnetic pen over the vertical scroll bar.

The present invention also provides an apparatus for scroll information input in an electromagnetic induction way, comprising an electromagnetic board including an inductive area and an electromagnetic pen, wherein a horizontal region and a vertical region capable of sensing movement directions of the electromagnetic pen and thus having functions of horizontal and vertical scroll bars are provided on the electromagnetic board.

The inductive area has a set of horizontally arranged coils, a set of vertically arranged coils, analog switches, a measurer, a signal generator and a controller provided therein.

The controller comprises a master controller and a slave controller.

The set of the vertically arranged coils is connected to the measurer via an analog switch, the measurer is connected to the master controller and the slave controller respectively, the master controller is connected to the slave controller, the slave controller is connected to the signal generator, and the signal generator is connected to the set of the horizontally arranged coils via a further analog switch.

Electromagnetic signals induced by the electromagnetic pen in the set of the vertically arranged coils are transferred to the measurer via the analog switch, and the measurer performs gain amplification, phase control, integration and AD conversion on the signals to obtain digital signals which are transferred to the master controller.

The horizontal region and the vertical region are provided as a horizontal groove and a vertical groove in the inductive area respectively.

The method and apparatus for scroll information input in the electromagnetic induction way according to the present invention have the following advantages. It is possible to achieve the scroll bar functions by means of the existing electromagnetic board device without increasing additional hardware items, and thus to overcome the problem in the prior art that only the vertical scroll bar can be achieved in implementing the scroll bar on the electromagnetic board in the electromagnetic induction way while requirements for horizontal scroll bar operations by some applications cannot be satisfied. Thus, the operations of users on the computer are eased in a cost-effective manner.

DETAILED DESCRIPTION OF PREFERRED EMBODIMENTS

According to the present invention, a method and an apparatus for scroll information input in an electromagnetic induction way are provided, where the complete scroll bar functions are achieved by the existing electromagnetic board device. Thus, it is possible to achieve an optimal effect without increasing the cost, and thus to overcome the problem in the prior art that it is only possible to implement a vertical scroll bar but is impossible to implement a horizontal scroll bar by means of the electromagnetic board.

To make the above objections, features and advantages of the present invention apparent, the present invention is described in more detail with reference to the drawings and embodiments thereof.

Figure 1:
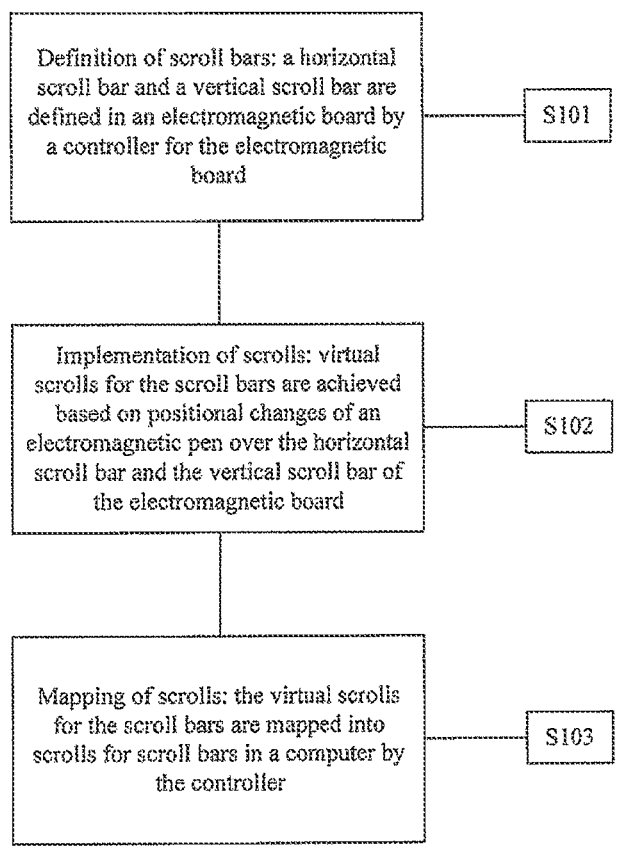
FIG. 1 is a flow chart showing a method for scroll information input in an electromagnetic induction way.

Referring to FIG. 1, it is a flow chart showing a method for scroll information input in an electromagnetic induction way according to an embodiment of the present invention. Specifically, the method comprises a step S101 of definition of scroll bars, where a horizontal scroll bar and a vertical scroll bar are defined by means of a controller for an electromagnetic board.

In the embodiment, the controller comprises a master controller and a slave controller. The scroll bars are defined by defining a horizontal region of an inductive area of the electromagnetic board as the horizontal scroll bar and defining a vertical region thereof as the vertical scroll bar by means of the master controller of the electromagnetic board.

The method further comprises a step S102 of implementation of scrolls, where virtual scrolls are achieved for the scroll bars of the electromagnetic board based on positional changes of an electromagnetic pen over the horizontal and vertical scroll bars of the electromagnetic board.

In the construction of the conventional electromagnetic board, there are many transmitting coils arranged horizontally for transmitting electromagnetic signals, and many receiving coils arranged vertically for receiving electromagnetic signals. In the electromagnetic pen, there is a resonance circuit for receiving electromagnetic signals, which is constituted of a capacitor and an inductor. The horizontally arranged transmitting coils are controlled by the slave controller through a signal generator to intermittently transmit electromagnetic signals. The inductive device of the electromagnetic pen receives the transmitted signals when the horizontally arranged transmitting coils are transmitting the signals, and transmits the induced electromagnetic signals when the horizontally arranged coils stop transmitting the signals. The vertically arranged coils receive the electromagnetic signals transmitted by the electromagnetic pen. The electromagnetic signals received by the vertically arranged coils are processed by a measurer and then is delivered to the master controller, and thus are further processed by the master controller and then outputted to the computer, where they are converted to the information, such as coordinates for a movement trace, magnitudes of pressure, and title angles, of the electromagnetic pen over the electromagnetic board.

In the present invention, the virtual scrolls for the scroll bars of the electromagnetic board may be achieved as follows.

The controller of the electromagnetic board determines that the electromagnetic pen is moving on the horizontal scroll bar based on the horizontal coordinate and the vertical coordinate. The virtual scroll for the horizontal scroll bar of the electromagnetic board is achieved based on the positional change of the electromagnetic pen on the horizontal scroll bar.

The movement of the electromagnetic pen on the vertical scroll bar may be determined as follows.

One from the set of the horizontally arranged coils of the electromagnetic board is turned on and sequentially transmits signals. Plural ones from the set of the vertically arranged collies of the electromagnetic board are sequentially turned on and receive the signals. The controller determines the vertical coordinate of the electromagnetic pen based on the variation in intensity of the signals received by the plural vertically arranged coils.

Plural ones from the set of the horizontally arranged coils of the electromagnetic board are sequentially turned on and transmit signals. One from the set of the vertically arranged coils of the electromagnetic board is turned on and receives the signals. The controller determines the horizontal coordinate of the electromagnetic pen based on the intensities of the signals received by the one vertically arranged coil.

The controller of the electromagnetic board determines that the electromagnetic pen is moving on the vertical scroll bar baser on the horizontal coordinate and the vertical coordinate. The virtual scroll for the vertical scroll bar of the electromagnetic board is achieved based on the positional change of the electromagnetic pen on the vertical scroll bar.

In implementing the virtual scroll for the horizontal scroll bar, first it is necessary to determine whether the electromagnetic pen is moving on the horizontal scroll bar or not.

Plural ones from the set of the horizontally arranged coils are controlled by the slave controller through the signal generator to be sequentially turned on and thus transmit electromagnetic signals. When the electromagnetic pen is moving in the horizontal region defined as the horizontal scroll bar by the master controller, the resonance circuit of the electromagnetic pen is induced by and thus receives the transmitted signals when the horizontally arranged transmitting coils are transmitting the signals, and transmits the induced electromagnetic signals when the horizontally arranged transmitting coils stop transmitting the signals. In this case, a certain one from the set of the vertically arranged coils receives the signals transmitted by the electromagnetic pen. The received signals are processed by the measurer, that is, are subjected to gain amplification, phase control, integration, and A/D conversion, referring to FIG. 4. The processed signals are transferred to the master controller. The master controller determines the horizontal coordinate of the electromagnetic pen based on the intensities of the signals.

One from the set of the horizontally arranged coils is controlled by the slayer controller through the signal generator to be turned on via an analog switch and thus sequentially transmit electromagnetic signals. The resonance circuit of the electromagnetic pen transmits the induced electromagnetic signals. Plural ones from the set of the vertically arranged coils are sequentially turned on and receive the signals transmitted by the electromagnetic pen, and transfer the signals to the measurer via an analog switch. The signals are processed by the measurer and then transferred to the master controller. The controller determines the vertical coordinate of the electromagnetic pen in the horizontal region based on the intensities of the signals.

The master controller determines that the electromagnetic pen is moving in the range of the horizontal scroll bar based on the horizontal coordinate and the vertical coordinate of the electromagnetic pen. Also, the master controller defines the positional change of the electromagnetic pen over the horizontal scroll bar as the virtual scroll for the horizontal scroll bar of the electromagnetic board, and outputs it to the computer.

In implementing the virtual scroll for the vertical scroll bar, it is also necessary to determine whether the electromagnetic pen is moving on the vertical scroll bar or not.

A certain one from the set of the horizontally arranged coils is controlled by the slave controller to be turned on and sequentially transmit signals. When the electromagnetic pen is moving in the vertical region defined as the vertical scroll bar by the master controller, the resonance circuit of the electromagnetic pen receives the transmitted signals when the one horizontally arranged transmitting coil is transmitting the signals, and transmits the induced electromagnetic signals when the one horizontally arranged coil stops transmitting the signals. Plural ones from the set of the vertically arranged coils are sequentially turned on and receive the signals transmitted by the electromagnetic pen. The received signals are processed by the measurer, that is, are subjected to gain amplification, phase control, integration, and ND conversion, referring to FIG. 4. The processed signals are transferred to the master controller. The master controller determines the vertical coordinate of the electromagnetic pen based on the intensities of the signals.

Plural ones from the set of the horizontally arranged coils are controlled by the slayer controller through the signal generator to be sequentially turned on and transmit electromagnetic signals. When the electromagnetic pen is moving in the vertical region defined as the vertical scroll bar by the master controller, the resonance circuit of the electromagnetic pen is induced by and thus receives the transmitted signals when the plural horizontally arranged transmitting coils are transmitting the signals, and transmits the induced electromagnetic signals when the plural horizontally arranged transmitting coils stop transmitting the signals. In this case, one from the set of the vertically arranged coils is turned on and sequentially receives the signals transmitted by the electromagnetic pen. The received signals are processed by the measurer. The processed signals are transferred to the master controller. The master controller determines the horizontal coordinate of the electromagnetic pen based on the variation in intensity of the signals.

The master controller determines that the electromagnetic pen is moving in the range of the vertical scroll bar based on the horizontal coordinate and the vertical coordinate of the electromagnetic pen. Also, the master controller defines the positional change of the electromagnetic pen over the vertical scroll bar as the virtual scroll for the vertical scroll bar of the electromagnetic board, and outputs it to the computer.

The method further comprises a step S103 of mapping of scrolls, where the virtual scrolls for the scroll bars of the electromagnetic board are mapped by the master controller into scrolls for scroll bars in the computer.

Correspondences between the horizontal scroll bar of the electromagnetic board and the horizontal scroll bar in the computer and between the vertical scroll bar of the electromagnetic board and the vertical scroll bar in the computer are established in the master controller.

The virtual scrolls for both the horizontal and vertical scroll bars of the electromagnetic board are mapped into the scrolls for both the horizontal and vertical scroll bars in the computer based on the correspondences.

According to the present invention, the complete scroll bar functions are achieved based on the existing electromagnetic board device by the processes recited in the above steps, and also the intrinsic functions of the electromagnetic board are reserved. Thus, it is possible to achieve the optimal effect without increasing the cost, to ease operations of users on the computer, and thus to produce advantages effects.

Based on the above method for scroll information input in the electromagnetic induction way, there is also provided an embodiment of an apparatus for scroll information input in the electromagnetic induction way.

The apparatus for scroll information input in the electromagnetic induction way comprises an electromagnetic board including an inductive area and an electromagnetic pen. The electromagnetic board is provided with a horizontal region and a vertical region which are controlled by a controller to have a horizontal scroll bar function and a vertical scroll bar function respectively. The inductive area is one inductive to signal(s) transmitted by the electromagnetic pen, and includes a set of horizontally arranged coils, a set of vertically arranged coils, analog switches, a measurer, a signal generator and the controller. The controller comprises a master controller and a slayer controller. The master controller defines a horizontal region within the inductive area as the horizontal scroll bar, and defines a vertical region within the inductive area as the vertical scroll bar.

Figure 2:
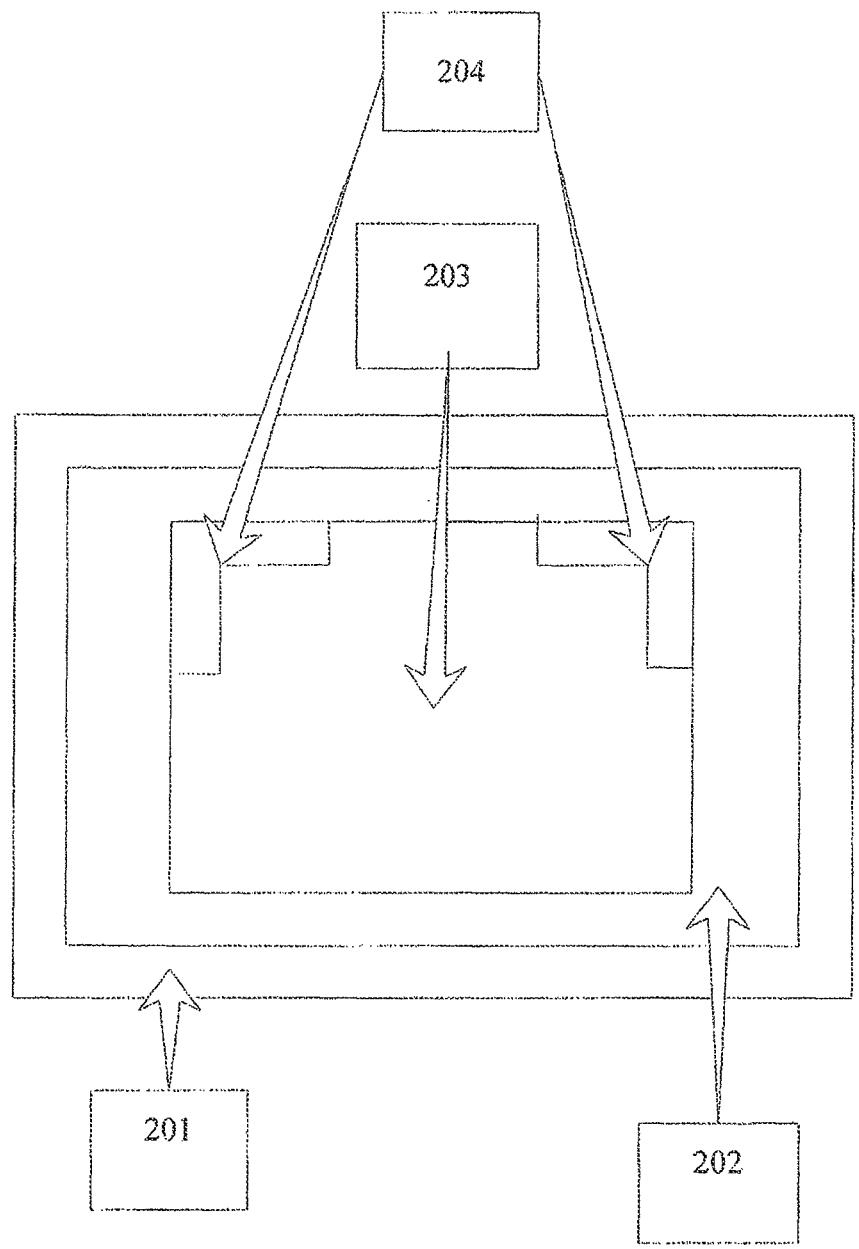
FIG. 2 is a schematic structural diagram showing an apparatus for scroll information input in an electromagnetic induction way.

Referring to FIG. 2, a schematic structural diagram is shown for the apparatus for scroll information input in the electromagnetic induction way. The electromagnetic is board 201 comprises the inductive area 202 to signal(s) transmitted from the electromagnetic pen. The electromagnetic-pen inductive area 202 is further divided into an electromagnetic pen movement trace sensing region 203 and two L-shaped bi-directional scroll bar regions 204.

Figure 3:
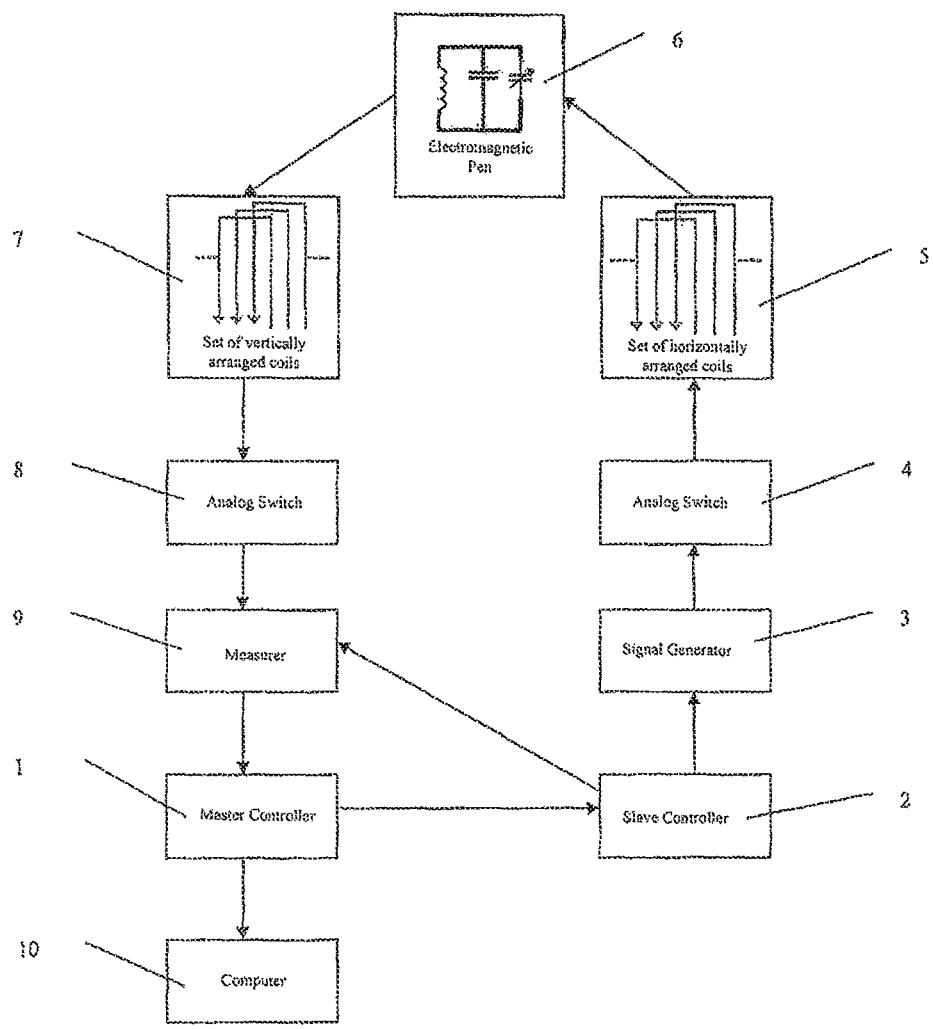
FIG. 3 is a functional block diagram showing an apparatus for scroll information input in an electromagnetic induction way.

Referring to FIG. 3, a functional block diagram is shown for the apparatus. In the electromagnetic-pen inductive area 202, the set of the horizontally arranged coils 5 and the set of the vertically arranged coils 7 are distributed. The set of the vertically arranged coils 7 are connected to the measurer 9 via an analog switch 8. The measurer 9 is connected to the master controller 1 and the slave controller 2. The master controller 1 is connected to the slave controller 2. The slave controller 2 is connected to the signal generator 3. The signal generator 3 is connected to the set of the horizontally arranged coils 5 via a further analog switch 4. The electromagnetic pen 6 has a resonance circuit constituted of a capacitor and an inductor provided therein. According to the embodiment, the analog switches are multi-way analog switches.

Figure 4:
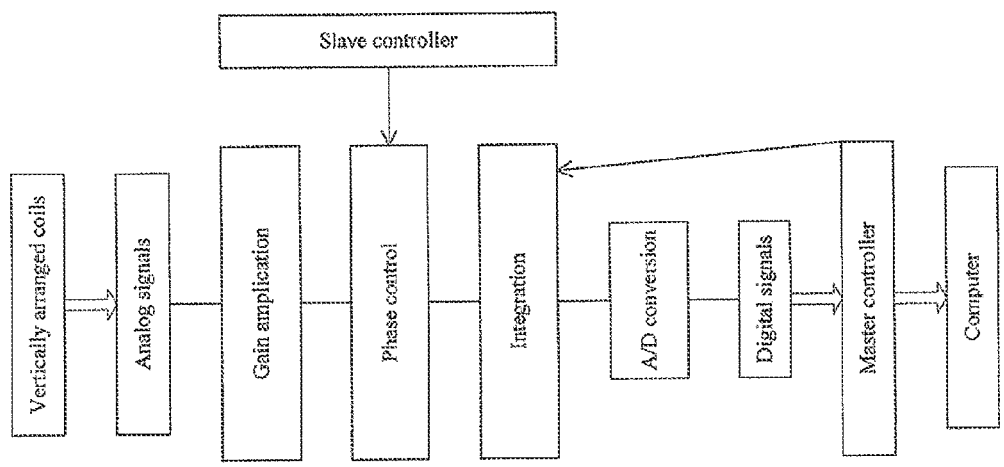
FIG. 4 is a flow chart showing signal processes in a measurer of an apparatus for scroll information input in an electromagnetic induction way.

Referring to FIG. 4, a flow chart of signal processes in the measurer is shown. The measurer first performs gain amplification on the signals received from the vertically arranged coils, conducts phase control on the signals under the control of the slayer controller, integrates the signals which have been subjected to the phase control under the control of the master controller, further carries out AD conversion on the signals (that is, conversion of the analog signals into digital signals), and then outputs the digital signals to the master controller, which, in turn, outputs the processed signals to the computer.

In operation of the apparatus, the slayer controller 2 controls, through the signal generator 3, the coils from the set of the horizontally arranged coils 5 to intermittently transmit electromagnetic signals. The resonance circuit of the electromagnetic pen 6 receives the signals when the horizontally arranged coils are transmitting the signals, and transmits the induced electromagnetic signals when the horizontally arranged coils stop transmitting the signals. One from the set of the vertically arranged coils 7 receives the electromagnetic signals transmitted by the electromagnetic pen. The signals are processed by the measurer 9 and then transferred to the master controller 1, which in turn outputs the signals to the external computer 10.

Hereinafter, how to achieve scrolls for the horizontal and vertical scroll bars in the computer based on movements of the electromagnetic pen over the horizontal and vertical regions of the electromagnetic board in this apparatus will be described in detail.

Referring to FIG. 2, the master controller defines the horizontal regions of the two L-shaped regions 204 of the electromagnetic board 201 as the horizontal scroll bars, and defines the vertical regions thereof as the vertical scroll bars.

Referring to FIG. 3, when the electromagnetic pen is moving in the horizontal regions of the electromagnetic board, the electromagnetic board achieves the horizontal scroll bar function as follows.

Plural ones from the set of the horizontally arranged coils 5 are controlled by the slave controller 2 through the signal generator 3 to be sequentially turned on via the analog switch and thus transmit electromagnetic signals. When the electromagnetic pen 6 is moving in the horizontal region defined as the horizontal scroll bar by the master controller, the resonance circuit of the electromagnetic pen 6 is induced by and thus receives the transmitted signals when the horizontally arranged transmitting coils are transmitting the signals, and transmits the induced electromagnetic signals when the horizontally arranged transmitting coils stop transmitting the signals. In this case, a certain one from the set of the vertically arranged coils 7 is turned on via the analog switch and sequentially receives the signals transmitted by the electromagnetic pen. The received signals are processed by the measurer 9, referring to FIG. 4. The processed signals are transferred to the master controller 1. The master controller 1 determines the horizontal coordinate of the electromagnetic pen based on the variation of the signals. One from the set of the horizontally arranged coils 5 is controlled by the slayer controller 2 through the signal generator 3 to be turned on via the analog switch and thus sequentially transmit electromagnetic signals. When the electromagnetic pen 6 is moving in the horizontal region defined as the horizontal scroll bar by the master controller, the resonance circuit of the electromagnetic pen 6 receives the transmitted signals when the horizontally arranged transmitting coil is transmitting the signals, and transmits the induced electromagnetic signals when the horizontally arranged coil stops transmitting the signals. In this case, plural ones from the set of the vertically arranged coils 7 are sequentially turned on via the analog switch and receive the signals transmitted by the electromagnetic pen. The received signals are processed by the measurer 9, referring to FIG. 4. The processed signals are transferred to the master controller 1. The master controller determines the vertical coordinate of the electromagnetic pen based on the variation of the signals. Further, the master controller 1 determines that the pen now is in the range of the horizontal scroll bar based on the horizontal coordinate and vertical coordinate of the electromagnetic pen, and maps the positional change of the electromagnetic pen in the horizontal region into the positional change of the horizontal scroll bar in the computer 10. The master controller outputs the positional change to the computer 10 to achieve scrolls for the horizontal scroll bar in the computer 10.

Referring to FIG. 3, when the electromagnetic pen is moving in the vertical regions of the electromagnetic board, the electromagnetic board achieves the vertical scroll bar function as follows.

A certain one from the set of the horizontally arranged coils 5 is controlled by the slave controller 2 through the signal generator 3 to be turned on via the analog switch and sequentially transmit signals. When the electromagnetic pen 6 is moving in the vertical region defined as the vertical scroll bar by the master controller, the resonance circuit of the electromagnetic pen 6 receives the transmitted signals when the horizontally arranged transmitting coil is transmitting the signals, and transmits the induced electromagnetic signals when the horizontally arranged coil stops transmitting the signals. In this case, plural ones from the set of the vertically arranged coils 7 are sequentially turned on via the analog switch and receive the signals transmitted by the electromagnetic pen. The received signals are processed by the measurer 9, referring to FIG. 4. The processed signals are transferred to the master controller 1. The master controller determines the vertical coordinate of the electromagnetic pen based on the variation of the signals.

Plural ones from the set of the horizontally arranged coils 5 are controlled by the slayer controller 2 through the signal generator 3 to be sequentially turned on via the analog switch and transmit electromagnetic signals. When the electromagnetic pen 6 is moving in the vertical region defined as the vertical scroll bar by the master controller, the resonance circuit of the electromagnetic pen 6 is induced by and thus receives the transmitted signals when the horizontally arranged transmitting coils are transmitting the signals, and transmits the induced electromagnetic signals when the horizontally arranged transmitting coils stop transmitting the signals. In this case, one from the set of the vertically arranged coils 7 is turned on via the analog switch and sequentially receives the signals transmitted by the electromagnetic pen. The received signals are processed by the measurer 9, referring to FIG. 4. The processed signals are transferred to the master controller 1. The master controller 1 determines the vertical coordinate of the electromagnetic pen based on the variation of the signals.

Plural ones from the set of the horizontally arranged coils 5 are controlled by the slayer controller 2 through the signal generator 3 to be sequentially turned on via the analog switch and transmit electromagnetic signals. When the electromagnetic pen 6 is moving in the vertical region defined as the vertical scroll bar by the master controller, the resonance circuit of the electromagnetic pen 6 is induced by and thus receives the transmitted signals when the horizontally arranged transmitting coils are transmitting the signals, and transmits the induced electromagnetic signals when the horizontally arranged transmitting coils stop transmitting the signals. In this case, one from the set of the vertically arranged coils 7 is turned on via the analog switch and sequentially receives the signals transmitted by the electromagnetic pen. The received signals are processed by the measurer 9, referring to FIG. 4. The processed signals are transferred to the master controller 1. The master controller 1 determines the horizontal coordinate of the electromagnetic pen based on the variation in intensity of the signals.

The master controller 1 determines that the electromagnetic pen now is in the range of the vertical scroll bar based on the horizontal coordinate and vertical coordinate of the electromagnetic pen 6, and maps the positional change of the electromagnetic pen in the vertical region into the positional change of the vertical scroll bar in the computer 10. The master controller outputs the positional change to the computer 10 to achieve scrolls for the vertical scroll bar in the computer.

According to the apparatus, the horizontal and vertical regions are provided in the electromagnetic-pen inductive area of the electromagnetic board, and are defined by the master controller as the horizontal and vertical scroll bars respectively. When the electromagnetic pen is moving over the horizontal and vertical regions, its positional change is mapped by the master controller into the positional change of the horizontal and vertical scroll bars in the computer. Thus, this apparatus achieves the scroll bar functions.

What is claimed is:

1. A method for scroll information input in an electromagnetic induction way, comprising steps of:
    definition of scroll bars, where a horizontal scroll bar and a vertical scroll bar are defined in an inductive area of an electromagnetic board by means of a controller for the electromagnetic board;
    implementation of scrolls, where virtual scrolls for the scroll bars are achieved based on positional changes of an electromagnetic pen over the horizontal scroll bar and the vertical scroll bar in the inductive area;
    and mapping of scrolls, where the virtual scrolls for the scroll bars are mapped into scrolls for scroll bars in a computer by means of the controller, wherein in the step of implementation of scrolls, the controller determines horizontal and vertical coordinates of the electromagnetic pen in the inductive area, further determines whether the electromagnetic pen is moving over the horizontal scroll bar or moving over the vertical scroll bar, and achieves the virtual scrolls for the scroll bars based on the positional changes of the electromagnetic pen over the scroll bars, and wherein the step of determining the electromagnetic pen is moving over the horizontal scroll bar comprises:
    plural ones from a set of horizontally arranged coils of the electromagnetic board being sequentially turned on and transmitting signals, one from a set of vertically arranged coils of the electromagnetic board being turned on and sequentially receiving the signals, and the controller determining the horizontal coordinate of the electromagnetic pen based on the signals received by the one vertically arranged coil;
    one from the set of the horizontally arranged coils of the electromagnetic board being turned on and sequentially transmitting signals, plural ones from the set of the vertically arranged coils of the electromagnetic board being sequentially turned on and receiving the signals, and the controller determining the vertical coordinate of the electromagnetic pen based on the signals received by the plural vertically arranged coils;
    and the controller of the electromagnetic board determining that the electromagnetic pen is moving over the horizontal scroll bar based on the horizontal coordinate and the vertical coordinate, and achieving the virtual scroll for the horizontal scroll bar of the electromagnetic board based on the positional change of the electromagnetic pen over the horizontal scroll bar, wherein in the step of definition of scroll bars, the controller of the electromagnetic board defines a horizontal region in the inductive area of the electromagnetic board as the horizontal scroll bar, and defines a vertical region thereof as the vertical scroll bar.

2. The method according to claim 1, wherein the step of determining the electromagnetic pen is moving over the vertical scroll bar comprises:
    one from a set of horizontally arranged coils of the electromagnetic board being turned on and sequentially transmitting signals, plural ones from a set of vertically arranged coils of the electromagnetic board being sequentially turned on and receiving the signals, and the controller determining the vertical coordinate of the electromagnetic pen based on the signals received by the plural vertically arranged coils;
    plural ones from the set of the horizontally arranged coils of the electromagnetic board being sequentially turned on and transmitting signals, one from the set of the vertically arranged coils of the electromagnetic board being turned on and sequentially receiving the signals, and the controller determining the horizontal coordinate of the electromagnetic pen based on the signals received by the one vertically arranged coil; and
    the controller of the electromagnetic board determining that the electromagnetic pen is moving over the vertical scroll bar based on the horizontal coordinate and the vertical coordinate, and achieving the virtual scroll for the vertical scroll bar of the electromagnetic board based on the positional change of the electromagnetic pen over the vertical scroll bar.

3. An apparatus for scroll information input in an electromagnetic induction way, comprising an electromagnetic board including an inductive area and an electromagnetic pen, wherein a horizontal region and a vertical region capable of sensing movement directions of the electromagnetic pen and thus having functions of horizontal and vertical scroll bars are provided on the electromagnetic board, wherein the inductive area has a set of horizontally arranged coils, a set of vertically arranged coils, and a controller provided therein, and wherein the controller is configured to:

sequentially turn on plural ones from the set of horizontally arranged coils to transmit signals, turn on one from the set of vertically arranged coil to sequentially receive the signals, and determine a horizontal coordinate of the electromagnetic pen based on the signals received by the one vertically arranged coil;

turn on one from the set of the horizontally arranged coils to sequentially transmit signals, sequentially turn on plural ones from the set of the vertically arranged coils to receive the signals, and determine a vertical coordinate of the electromagnetic pen based on the signals received by the plural vertically arranged coils;

and determine that the electromagnetic pen is moving over the horizontal scroll bar based on the horizontal coordinate and the vertical coordinate, wherein in the step of definition of scroll bars, the controller of the electromagnetic board defines a horizontal region in the inductive area of the electromagnetic board as the horizontal scroll bar, and defines a vertical region thereof as the vertical scroll bar.

4. The apparatus according to claim 3, wherein the inductive area further has analog switches, a measurer, and a signal generator provided therein.

5. The apparatus according to claim 4, wherein the controller comprises a master controller and a slave controller.

6. The apparatus according to claim 5, wherein the set of the vertically arranged coils is connected to the measurer via an analog switch, the measurer is connected to the master controller and the slave controller respectively, the master controller is connected to the slave controller, the slave controller is connected to the signal generator, and the signal generator is connected to the set of the horizontally arranged coils via a further analog switch.

7. The apparatus according to claim 4, wherein electromagnetic signals induced by the electromagnetic pen in the set of the vertically arranged coils are transferred to the measurer via the analog switch, and the measurer performs gain amplification, phase control, integration and AD conversion on the signals to obtain digital signals which are transferred to the master controller.

8. The apparatus according to claim 2, wherein the horizontal region and the vertical region are provided as a horizontal groove and a vertical groove in the inductive area respectively.

9. The apparatus according to claim 5, wherein electromagnetic signals induced by the electromagnetic pen in the set of the vertically arranged coils are transferred to the measurer via the analog switch, and the measurer performs gain amplification, phase control, integration and AD conversion on the signals to obtain digital signals which are transferred to the master controller.

10. The apparatus according to claim 6, wherein electromagnetic signals induced by the electromagnetic pen in the set of the vertically arranged coils are transferred to the measurer via the analog switch, and the measurer performs gain amplification, phase control, integration and AD conversion on the signals to obtain digital signals which are transferred to the master controller.

11. The apparatus according to claim 3, wherein the horizontal region and the vertical region are provided as a horizontal groove and a vertical groove in the inductive area respectively.

12. The apparatus according to claim 4, wherein the horizontal region and the vertical region are provided as a horizontal groove and a vertical groove in the inductive area respectively.

13. The apparatus according to claim 5, wherein the horizontal region and the vertical region are provided as a horizontal groove and a vertical groove in the inductive area respectively.

14. The apparatus according to claim 6, wherein the horizontal region and the vertical region are provided as a horizontal groove and a vertical groove in the inductive area respectively.

* * * * *